United States Patent
Kobayashi

(10) Patent No.: US 11,089,168 B2
(45) Date of Patent: Aug. 10, 2021

(54) IMAGE PROCESSING APPARATUS, METHOD TO GENERATE IMAGE DATA AND REGISTERING TEMPLATE FOR TRANSMITTING TO A FOLDER NAMED BY A CHARACTER STRING

(71) Applicant: CANON KABUSHIKI KAISHA, Tokyo (JP)

(72) Inventor: Shinsaku Kobayashi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/821,687

(22) Filed: Mar. 17, 2020

(65) Prior Publication Data
US 2020/0314250 A1  Oct. 1, 2020

(30) Foreign Application Priority Data
Mar. 29, 2019 (JP) .............................. JP2019-068838

(51) Int. Cl.
*H04N 1/00* (2006.01)
*H04N 1/417* (2006.01)
(Continued)

(52) U.S. Cl.
CPC ....... *H04N 1/0001* (2013.01); *H04N 1/00331* (2013.01); *H04N 1/4177* (2013.01); *G06F 3/1256* (2013.01); *G06K 9/00483* (2013.01); *G06K 9/2054* (2013.01); *G06K 2209/01* (2013.01); *H04N 1/00135* (2013.01); *H04N 1/00798* (2013.01); *H04N 1/32438* (2013.01); *H04N 1/32507* (2013.01)

(58) Field of Classification Search
None
See application file for complete search history.

(56) References Cited

U.S. PATENT DOCUMENTS 7,469,063 B2 * 12/2008 Koyama ............ G06K 9/00456
358/474
2005/0195446 A1 * 9/2005 Kasatani ............ H04N 1/00222
358/402
(Continued)

FOREIGN PATENT DOCUMENTS

JP      2005-234708 A    9/2005
JP      2010262584 A    11/2010

*Primary Examiner* — Haris Sabah
(74) *Attorney, Agent, or Firm* — Canon U.S.A., Inc. IP Division

(57) ABSTRACT

An image processing apparatus according to the present invention includes a registration unit configured to register first image data as a template, a character recognition unit configured to recognize one or more character strings included in second image data different from the first image data, a display unit configured to display the one or more character strings recognized by the character recognition a reception unit configured to receive a selection of a character string displayed by the display unit, the selection being made by a user, and a storage unit configured to store the second image data in a folder named with a character string based on the selection received by the reception unit. The display unit does not display, from among of the one or more character strings recognized by the character recognition unit, a character string included in the image data registered by the registration.

15 Claims, 15 Drawing Sheets

(51) Int. Cl.
  *G06F 3/12*    (2006.01)
  *H04N 1/32*    (2006.01)
  *G06K 9/20*    (2006.01)
  *G06K 9/00*    (2006.01)

(56) References Cited

U.S. PATENT DOCUMENTS

| | | | |
|---|---|---|---|
| 2011/0058228 A1* | 3/2011 | Inamoto | G06K 9/18 |
| | | | 358/448 |
| 2012/0120444 A1* | 5/2012 | Hirohata | G06K 9/42 |
| | | | 358/1.15 |
| 2013/0085746 A1* | 4/2013 | Itoh | G06K 9/03 |
| | | | 704/9 |
| 2014/0078565 A1* | 3/2014 | Fujiwara | G03G 15/5062 |
| | | | 358/505 |
| 2015/0146254 A1* | 5/2015 | Hayashi | H04N 1/32144 |
| | | | 358/1.15 |
| 2015/0332492 A1* | 11/2015 | Igarashi | H04N 1/00005 |
| | | | 358/452 |
| 2016/0072968 A1* | 3/2016 | Nakamura | H04N 1/00241 |
| | | | 358/1.15 |
| 2017/0099403 A1 | 4/2017 | Honda | |

* cited by examiner

FIG.6

DEVICE SERIAL NO.: abcd0101
APPLICATION MANAGEMENT  ONE-TOUCH TRANSMISSION SCAN > DETAILED BUTTON INFORMATION > BUTTON EDITING

BUTTON EDITING ~600
610~ [OK] [CANCEL]~611

DETAILED BUTTON INFORMATION
BASIC SETTINGS
 BUTTON NAME: [MEDICAL QUESTIONNAIRE]~601
  ☐ DISPLAY CONFIRMATION SCREEN BEFORE EXECUTION

FILE NAME: [BUTTON NAME ▼]~602
            [AUTOMATIC]

ICON: ☐ 📄 ☑ 📋 ☐ 📄 ☐ 🗂 ☐ 🔺

ORGANIZATION: [DO NOT ORGANIZE ▼]~603
               [ORGANIZE (FILE)]
               [ORGANIZE (FOLDER)]

TRANSMISSION TYPE: [FILE ▼]         [CHANGE]~605
                    [E-MAIL]
              604  [USB MEMORY]

606~ TRANSMISSION SETTINGS (FILE)

TRANSMISSION DESTINATION: [\\FILE SERVER\MEDICAL_QUESTIONNAIRE] [SELECT FROM ADDRESS BOOK...]
  READ SIZE: [A4 ▼]                          607          608
  COLOR MODE: [COLOR ▼]
  FILE FORMAT: [PDF(OCR) ▼]~609
   ENCRYPTED PDF: [EQUIVALENT TO ACROBAT 100/256-bit AES ▼]
    ☐ SET/CHANGE PASSWORD
    PASSWORD: [                    ]
    INPUT PASSWORD
    FOR CONFIRMATION: [                    ]
   ELECTRONIC SIGNATURE: [NONE ▼]
    ☐ DIVIDE FOR EACH PAGE
  DENSITY: [0 ▼]
  DOCUMENT ORIENTATION: [LONGITUDINALLY LONG DOCUMENT ▼]
  DOCUMENT TYPE: [TEXT/PHOTOGRAPH ▼]
  DOUBLE-SIDED DOCUMENT: [SPREAD DOCUMENT ▼]
  SHARPNESS: [0 ▼]
  DATA SIZE: [LARGE: IMAGE QUALITY PRIORITIZED ▼]

SETTING MENU CHANGES FOR EACH TRANSMISSION TYPE

FIG.10

TEMPLATE REGISTRATION

901 — MEDICAL QUESTIONNAIRE

MEDICAL QUESTIONNAIRE
DATE OF CONSULTATION
NAME          ID
CONSULTATION BRANCH OTOLARYNGOLOGY

MEDICAL QUESTIONNAIRE

DATE OF CONSULTATION

ID

CONSULTATION BRANCH

OTOLARYNGOLOGY

APPLY 902  904  1001  903  1002  1003

FIG.13

MEDICAL QUESTIONNAIRE

\\FILE_SERVER\MEDICAL_QUESTIONNAIRE\

MEDICAL QUESTIONNAIRE
DATE OF CONSULTATION  JAN. 23
NAME  TARO YAMADA   ID 12345
CONSULTATION BRANCH  OTOLARYNGOLOGY

JAN. 23

TARO YAMADA

12345

OTOLARYNGOLOGY

APPLY

FIG.14

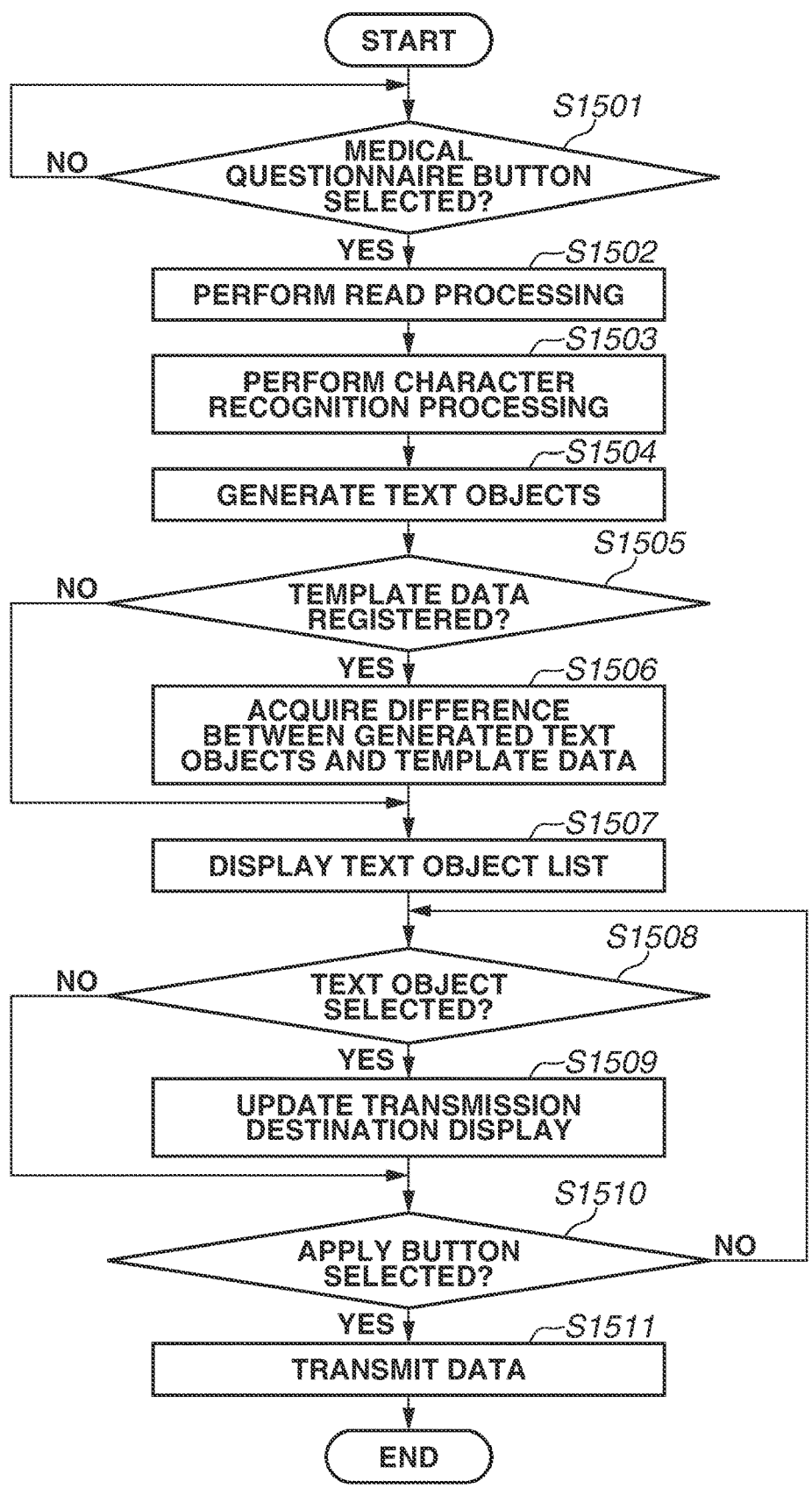

IMAGE PROCESSING APPARATUS, METHOD TO GENERATE IMAGE DATA AND REGISTERING TEMPLATE FOR TRANSMITTING TO A FOLDER NAMED BY A CHARACTER STRING

BACKGROUND OF THE INVENTION

Field of the Invention

The present invention relates to an image processing apparatus, a method for controlling the image processing apparatus, and a storage medium.

Description of the Related Art

Japanese Patent Application Laid-Open No. 2005-234708 discusses an image processing apparatus for reading an image on a document to generate image data, performing character recognition processing on an area pre-specified by the user, and transmitting the image data to a folder named by a character string obtained in the character recognition processing.

Inputting characters of a folder path one by one by using a keyboard takes much time and effort.

With a technique discussed in Japanese Patent Application Laid-Open No. 2005-234708, specifying an area in a document eliminates the need of inputting characters of a folder path one by one. However, for a document that does not include, in the specified area, a character string intended to be used by the user as the name of a destination folder, the target character string cannot be set in the folder path.

In particular, since the position of the target character string often differs from document to document to be read, it is necessary to set an area for each document, which is troublesome.

Further, if character strings included in the entire document are extracted without specifying an area, and the user is prompted to select one of the extracted character strings for use as a folder name, the user needs to select a character string to be set as a destination from among many character strings. This complicates the user's selection operations.

SUMMARY OF THE INVENTION

The present invention has been devised in view of the above-described issues, and is directed to reducing the user's time and effort in setting a folder path by using a character string in a document.

An image processing apparatus according to the present invention includes a registration unit configured to register first image data as a template, a character recognition unit configured to recognize one or more character strings included in second image data different from the first image data, a display unit configured to display the one or more character strings recognized by the character recognition unit, a reception unit configured to receive a selection of a character string from among the one or more character strings displayed by the display unit, the selection being made by a user, and a storage unit configured to store the second image data in a folder named with a character string based on the selection received by the reception unit. From among the one or more character strings recognized by the character recognition unit, the display unit does not display a character string included in the first image data registered by the registration unit.

Further features of the present invention will become apparent from the following description of exemplary embodiments with reference to the attached drawings.

BRIEF DESCRIPTION OF THE DRAWINGS

FIG. 6 illustrates an example of a button setting editing screen for performing a one-touch transmission scan.

FIG. 10 illustrates another example of the template registration screen.

FIG. 13 illustrates an example of a medical questionnaire screen.

FIG. 14 illustrates another example of a medical questionnaire screen.

FIG. 15 is a flowchart illustrating an example of one-touch transmission processing using a template.

DESCRIPTION OF THE EMBODIMENTS

Figure 1:
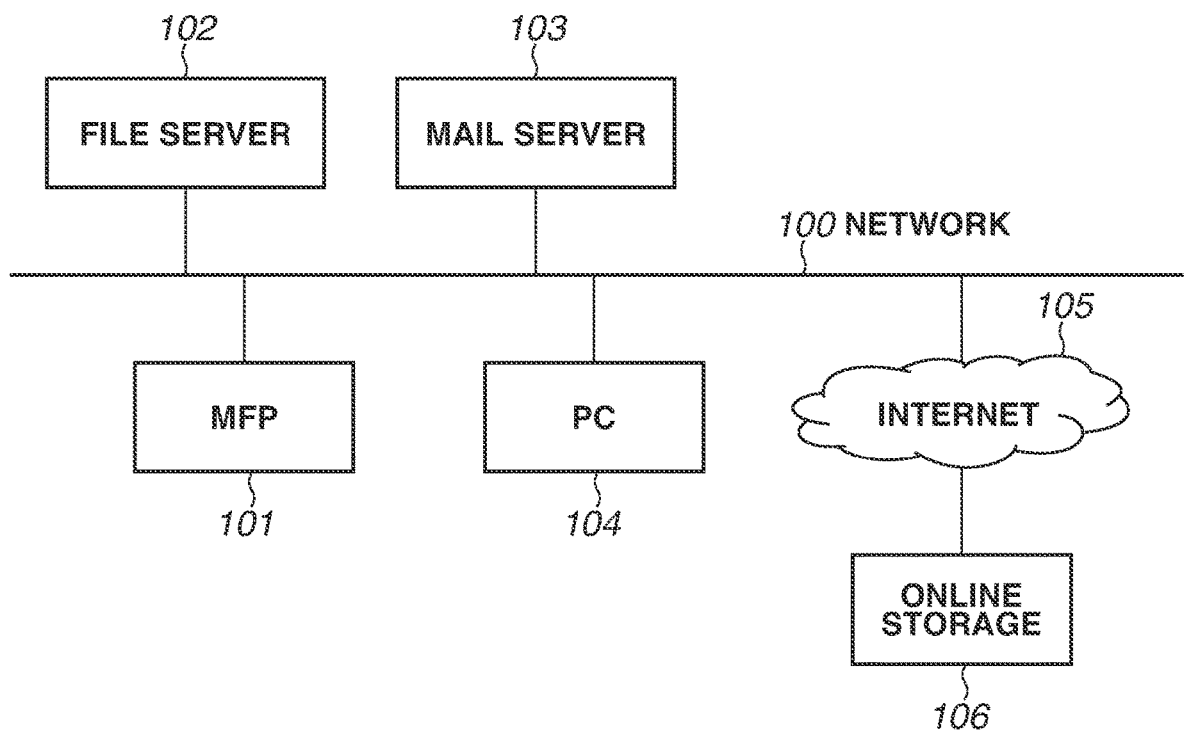
FIG. 1 illustrates an example of a configuration of a reading system.

Each of the embodiments of the present invention described below can be implemented solely or as a combination of a plurality of the embodiments or features thereof where necessary or where the combination of elements or features from individual embodiments in a single embodiment is beneficial. A first exemplary embodiment of the present invention will be described below. FIG. 1 illustrates an example of a configuration of a reading system according to the present exemplary embodiment. The reading system according to the present exemplary embodiment includes a multifunction peripheral (MFP) 101 as an example of an image processing apparatus, a file server 102 as an information processing apparatus, a mail server 103, and an online storage 106. The MFP 101, the file server 102, the mail server 103, and the online storage 106 are connected to a Local Area Network (LAN) 100. On the LAN 100, the MFP 101, the file server 102, the mail server 103, and the personal computer (PC) 104 are connected through a network so that they can communicate with each other. The MFP 101 and the online storage 106 can communicate with each other via the LAN 100 and the Internet 105.

The MFP 101 reads an image of a document, generates the read image, and transmits the generated image data to the file server 102, the mail server 103, and the online storage 106. Image data according to the present exemplary embodiment is not limited to electronic data obtained by an image being converted into RAW image format data, and may be electronic data in such image formats as Tag Image File Format (TIFF) and Joint Photographic Experts Group (PEG), and electronic data in Portable Document Format (PDF). The file server 102 is a file server conforming to File Transfer Protocol (FTP) and the Server Message Block (SMB) protocols. The mail server 103 is a mail server conforming to Simple Mail Transfer Protocol (SMTP). The online storage 106 is an online storage conforming to Web-based Distributed Authoring and Versioning (Web-DAV) (a file sharing protocol using Hyper Text Transfer Protocol (HTTP)). The PC 104 accesses the web server included in the MFP 101 by using HTTP and is capable of referencing and updating setting values. The LAN 100 may include a wired LAN using Ethernet or a wireless LAN.

Figure 2:
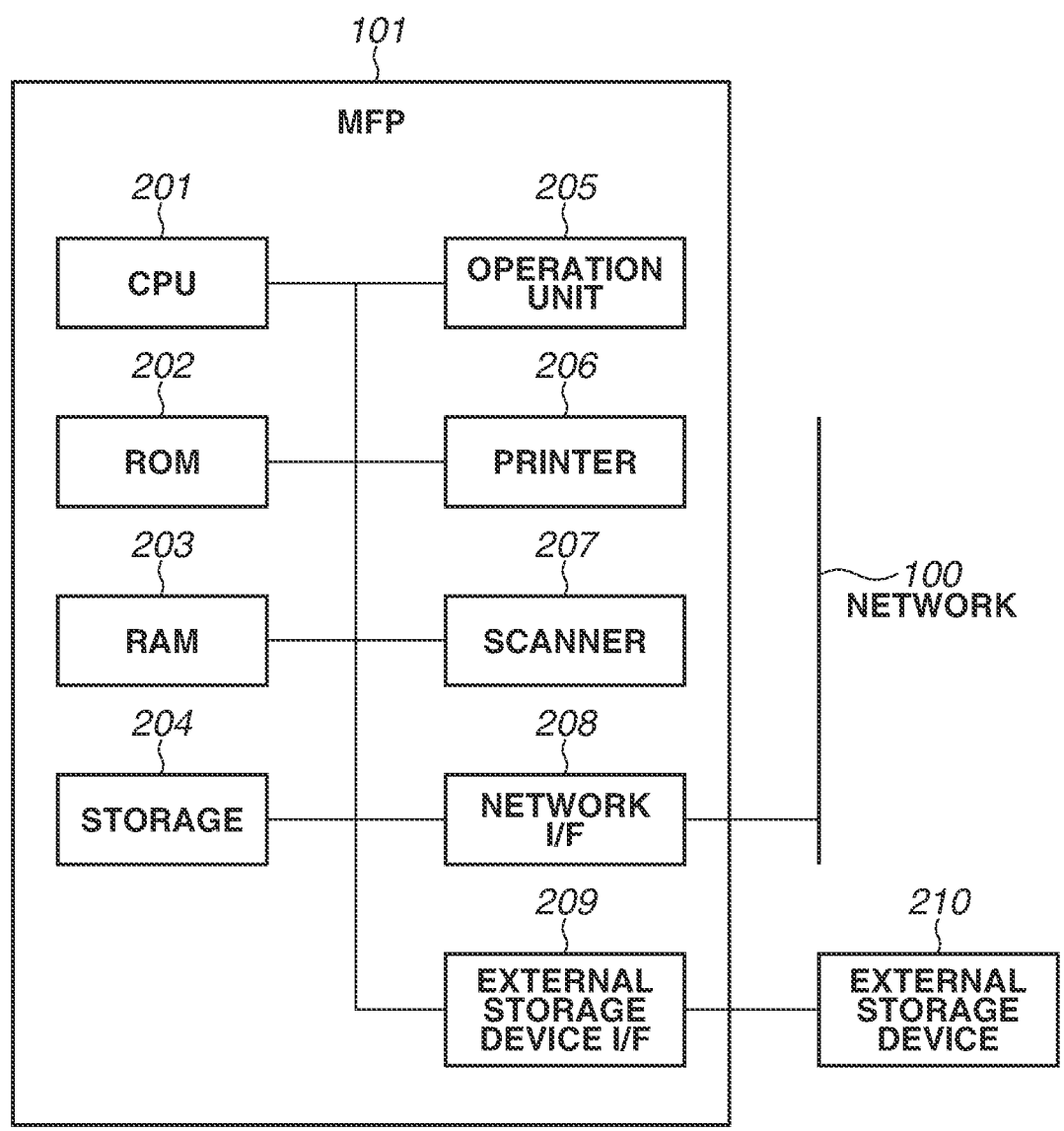
FIG. 2 illustrates an example of a hardware configuration of a multifunction peripheral (MFP).

FIG. 2 illustrates an example of a hardware configuration of the MFP 101. The MFP 101 includes a CPU 201, a ROM 202, a RAM 203, a storage 204, an operation unit 205, a printer 206, a scanner 207, a network interface (I/F) 208, and an external storage device I/F 209.

The CPU 201 controls various hardware components 202 to 208 included in the MFP 101 to implement each function of the MFP 101. The CPU 201 transmits signals to various hardware components via bus lines to implement data communication with other hardware components.

The CPU 201 of the MFP 101 controls the operation of the MFP 101 in accordance with a control program stored the ROM 202. More specifically, the CPU 201 executes an operating system (OS) for controlling the MFP 101 and driver programs for controlling the hardware components, Function operations and control desired by the user are implemented by application programs arranged on the OS mutually operating. The OS and various programs stored in the ROM 202 are read in the RAM 203 and then executed.

The ROM 202 is a memory for storing programs and various data to be used by the CPU 201. The RAM 203 is a work memory for temporarily storing a program and data to be used for computations by the CPU 201. The storage 204 is a storage device for storing various data and various programs.

Although a flash memory is assumed as the storage 204 according to the present exemplary embodiment, a solid state drive (SSD), a hard disk drive (HDD), an embedded multimedia card (eMMC), and other auxiliary storage devices are also applicable. Although, in the MFP 101, a single CPU 201 executes processing illustrated in flowcharts (described below) by using a single memory (RAM 203), the MFP 101 may use other configurations. For example, processing illustrated in flowcharts (described below) may be performed by a plurality of CPUs, a plurality of RAMs, a plurality of ROMs, and a plurality of storages being operated in a collaborative way. Part of processing may be executed by using hardware circuitry, such as an Application Specific Integrated Circuit (ASIC) and a Field Programmable Gate Array (FPGA).

The operation unit 205 is a user interface, such as a touch panel, for the user to operate the MFP 101, and serves as a reception unit for receiving operations and inputs by the user. The operation unit 205 can also be used as a display unit for displaying screens for operating the MFP 101.

The printer 206 is a unit for implementing a print function. The CPU 201 controls the printer 206 to execute a print job received from the PC 104, thus printing an image on paper. A print job herein is data including instructions to cause the MFP 101 to perform print processing, image data, and print setting information.

The scanner 207 is a unit for implementing a scanning function. The CPU 201 controls the scanner 207 to perform processing for optically reading an image of a document and generating image data.

The network I/F 208 performs wired LAN communication, such as the communication over Ethernet. The network I/F 208 may be a network I/F for performing wireless LAN communication or a Universal Serial Bus (USB)-LAN I/F.

The external storage device I/F 209 is an interface for the MFP 101 to communicate with an external storage device 210. The CPU 201 controls the external storage device I/F 209 to store image data in the external storage device 210. Although, in the present exemplary embodiment, a USB interface is assumed as the external storage device I/F 209 and a USB memory is assumed as the external storage device 210, the external storage device I/F 209 may be a Secure Digital (SD) card slot for communicating with an external storage device, such as an SD card.

Figure 3:
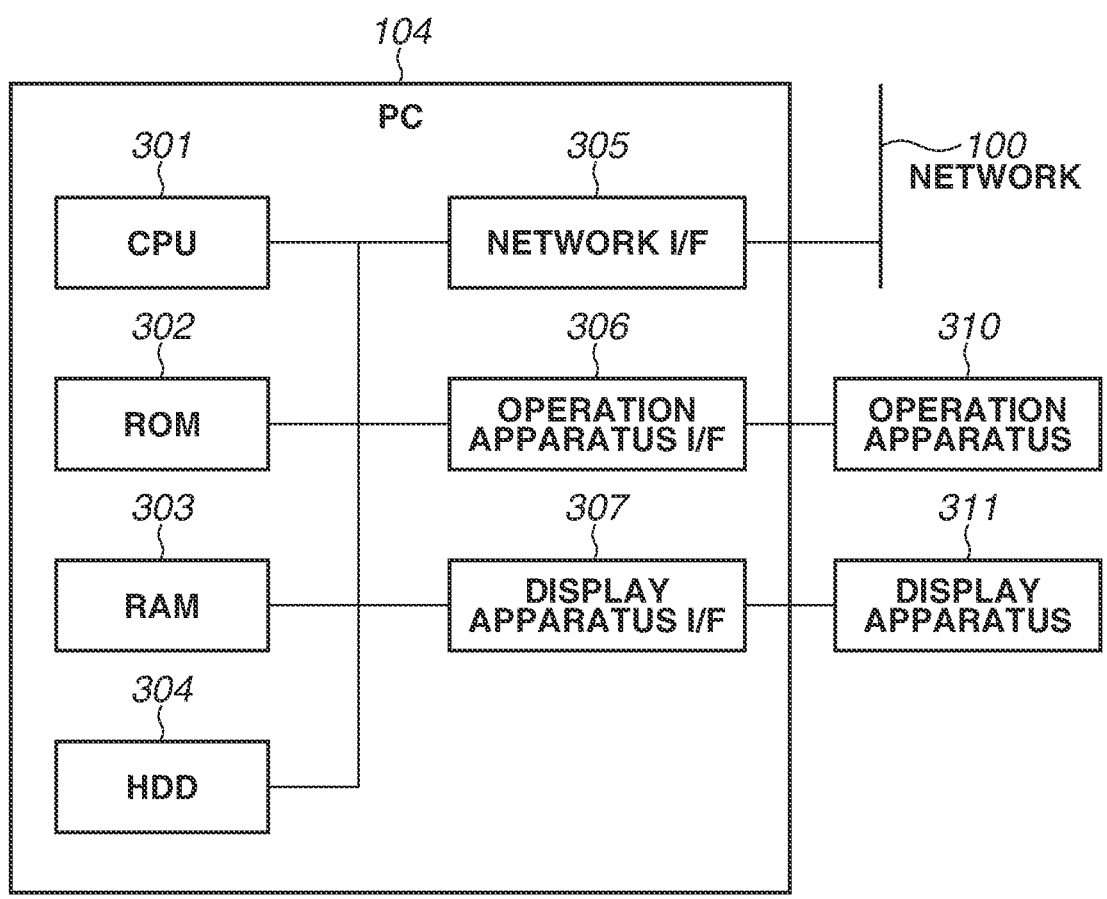
FIG. 3 illustrates an example of a hardware configuration of a personal computer (PC).

FIG. 3 illustrates an example of a hardware configuration of the PC 104. The PC 104 includes a CPU 301, a ROM 302, a RAM 303, an HDD 304, a network I/F 305, an operation apparatus I/F 306, and a display apparatus I/F 307.

The CPU 301 controls various hardware components 302 to 307 included in the PC 104 to implement each function of the PC 104. The CPU 301 transmits signals to various hardware components via bus lines to implement data communication with other hardware components.

The CPU 301 of the PC 104 controls the operation of the PC 104 in accordance with a control program stored in the ROM 302. More specifically, the CPU 301 executes the OS for controlling the PC 104. The function operations and control desired by the user are implemented by the application programs arranged on the OS mutually operating. The OS and various programs, which are stored in the ROM 302, are read in the RAM 303 and then executed.

The ROM 302 is a memory for storing programs and various data to be used by the CPU 301. The RAM 303 is a work memory for temporarily storing a program and data to be used for computations by the CPU 201. The HDD 304 is a storage device for storing various data and various programs.

The network I/F 305 performs wired LAN communication, such as one over Ethernet. The network I/F 305 may be a network I/F for performing wireless LAN communication or a USB-LAN I/F.

The operation apparatus I/F 306 is an interface for connecting the PC 104 to an operation apparatus 310, such as a keyboard and a mouse.

The display apparatus OF 307 is an interface for connecting the PC 104 to a display apparatus 311, such as a liquid crystal display monitor.

Although the PC 104 according to the present exemplary embodiment is connected to an external operation apparatus and an external display apparatus, for example, an operation unit and a display unit may be built in the PC 104.

Figure 4:
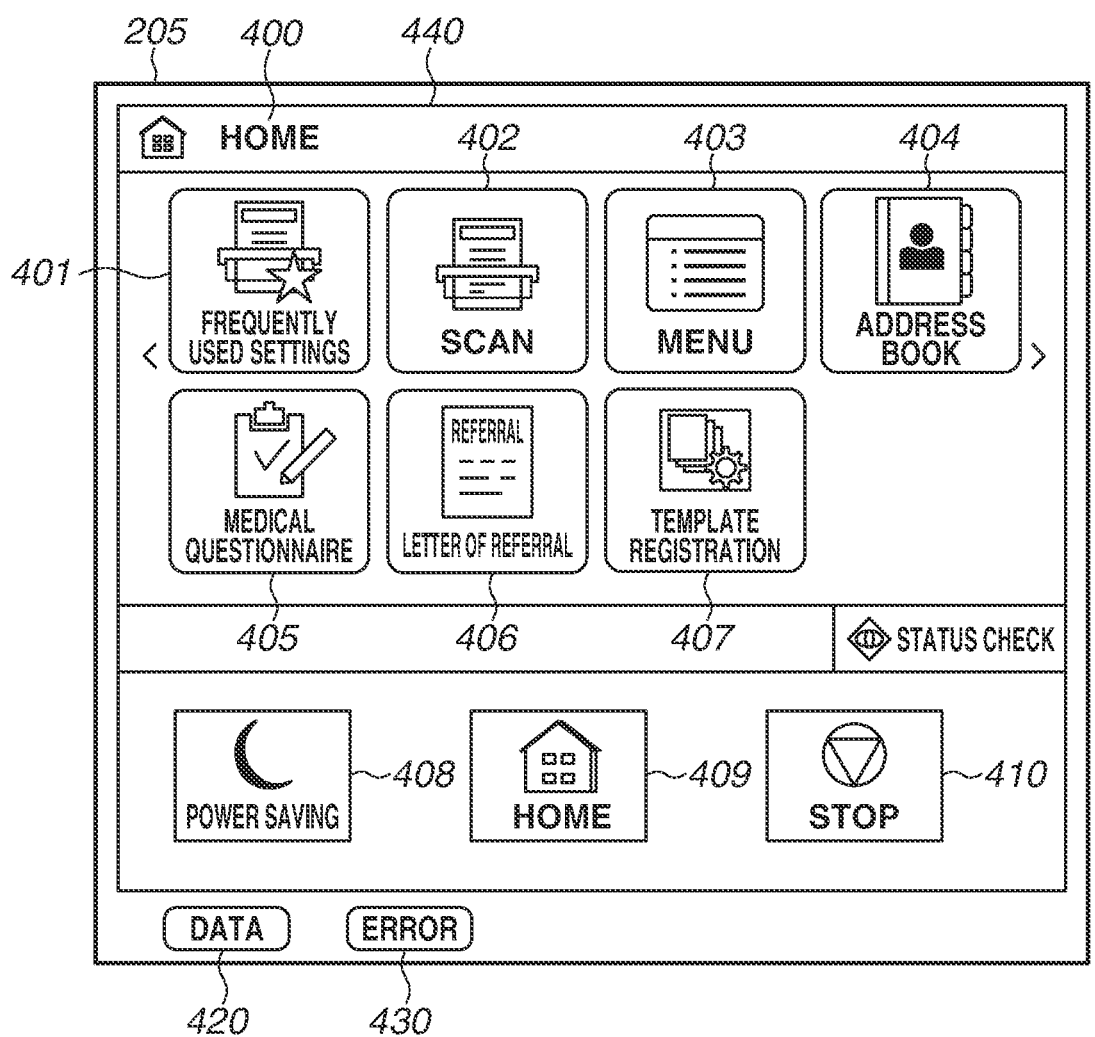
FIG. 4 illustrates an example of a screen which is displayed on an operation unit.

FIG. 4 illustrates an example of a screen which is displayed on the operation unit 205. The operation unit 205 includes a touch panel 440, a Data LED 420, and an Error LED 430. The touch panel 440 displays a Home screen 400 which is displayed immediately after the MFP 101 is activated. The Home screen 400 is a screen for the user to instruct the MFP 101 to execute functions of the MFP 101. The Home screen 400 displays a Frequently Used Settings button 401, a Scan button 402, a Menu button 403, an Address Book button 404, a Medical Questionnaire button 405, and a "Letter of Referral" button 406. The Home screen 400 constantly displays a Power-Saving button 408, a Home button 409, and a Stop button 410, The Power-Saving button 408, the Home button 409, and the Stop button 410 may be provided as hardware keys on the operation unit 205.

The Frequently Used Settings button 401 is used for displaying, when selected by the user, a screen for performing a specific function in a state where user settings have been input.

The Scan button 402 is used for displaying, when selected by the user, a screen for performing scan processing to generate image data, transmitting the generated image data through e-mail or file transmission, and storing the image data in the external storage device 210. The e-mail transmission refers to transmitting image data generated by reading a document, as attachment data with an e-mail. The file transmission refers to transmitting image data to the file server 102 or the PC 104 by using a communication protocol, such as SMB and FTP.

The Menu button 403 is used for displaying, when selected by the user, a menu screen.

The Address Book button 404 is used for displaying, when selected by the user, a screen displaying registered addresses (destination information). The screen displaying addresses exhibits the transmission type, such as, e-mail transmission, SMB transmission, FTP transmission, and WebDAV transmission, and destination information, such as mail address, host name, and server information.

The Medical Questionnaire button 405 and the Letter of Referral button 406 are one-touch transmission buttons. A one-touch transmission button is used for displaying, when selected by the user, a screen for reading an image of a document based on scanning settings preset by the user to generate image data, and transmitting the image data based on the transmission type preset by the user.

A Template Registration button 407 is used for registering a template for one-touch transmission. The operations to be performed when the Template Registration button 407 is selected will be described below.

The Power-Saving button 408 is used for shifting, when selected by the user, the MFP 101 to the power-saving state.

The Home button 409 is used for displaying, when selected by the user, the Home screen 400 on the operation unit 205.

The Stop button 410 is used for canceling, when selected by the user, the execution of a job, such as a print job currently being executed by the MFP 101. This Stop button 410 may cancel the execution of a copy job or a transmission job when selected by the user.

The Data LED 420 and the Error LED 430 notify the user of the status of the MFP 101. The Data LED 420 illuminates during execution of e-mail or file transmission. The Error LED 430 illuminates if an error occurs in the MFP 101.

The Home screen 400 is a function selection screen for a user to select a function to use from among a plurality of functions including a copy function of performing printing based on image data, and a transmission function of reading an image on a document to generate image data and transmitting the image data to an external apparatus.

Figure 5:
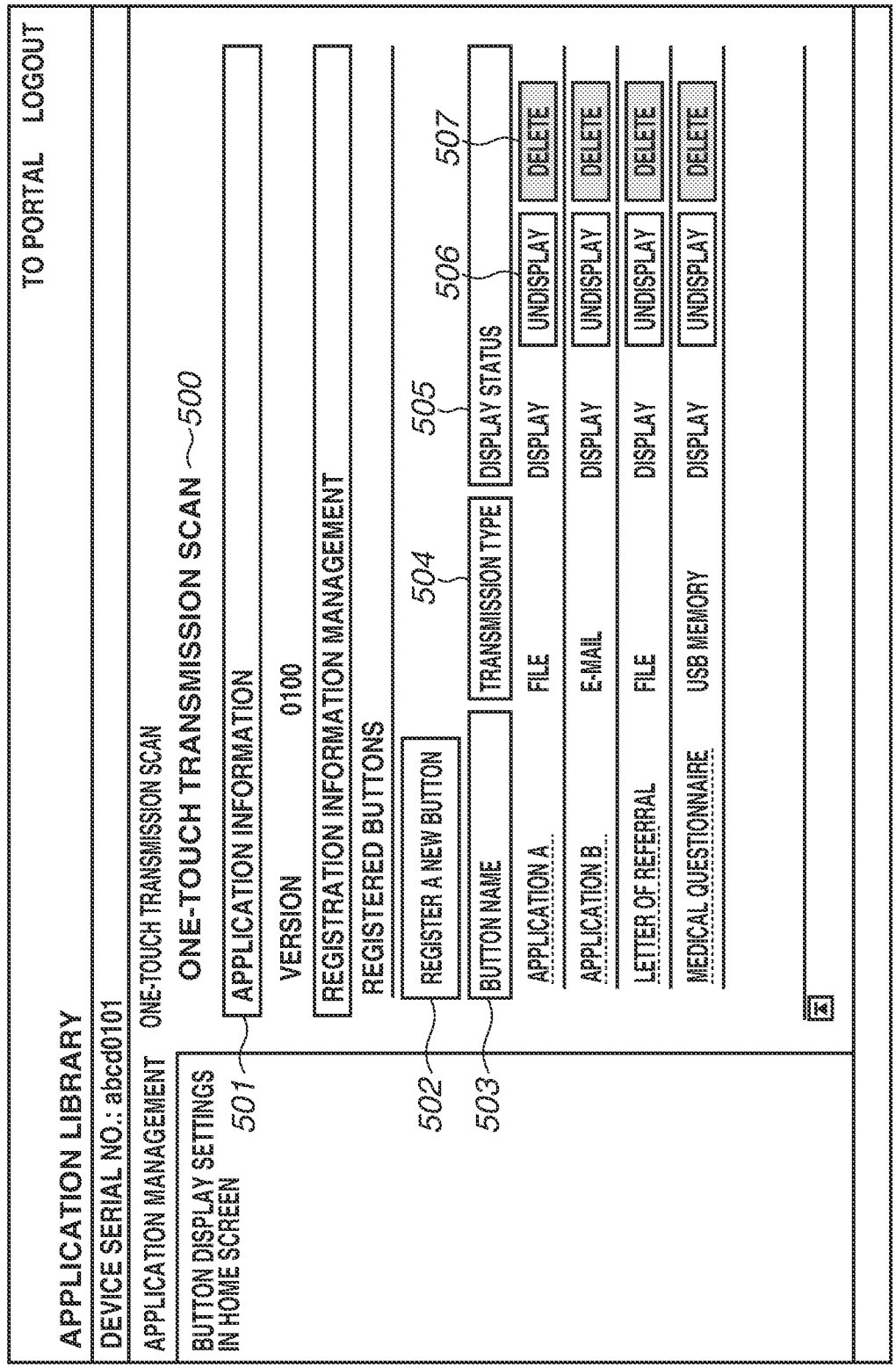
FIG. 5 illustrates an example of a one-touch transmission scan setting screen which is displayed on a display apparatus.

FIG. 5 illustrates an example of a one-touch transmission scan setting screen which is displayed on a display apparatus 311. A one-touch transmission scan setting screen 500 illustrated in FIG. 5 is displayed, for example, on the display apparatus 311 connected to the PC 104 which is accessing the web server of the MFP 101 through HTTP communication.

The one-touch transmission scan setting screen 500 displays Application Information area 501, a "Register New Button" button 502, items 503 to 505, Display/Undisplay buttons 506, and Delete buttons 507.

The Application information area 501 displays the version number of the application. Referring to FIG. 5, the version number 1.00 is displayed.

The "Register New Button" button 502 is used for registering, when selected by the user, a new button which is to be displayed on a screen displayed on the operation unit 205 and is used for executing a one-touch transmission scan. When the "Register New Button" button 502 is selected, a button setting editing screen 600 illustrated in FIG. 6 is displayed on the display apparatus 311. The button setting editing screen 600 illustrated in FIG. 6 will be described in detail below.

The item 503 indicates the name of buttons for performing a one-touch transmission scan registered in the MFP 101.

The item 504 indicates the transmission type set to buttons for performing a one-touch transmission scan registered in the MFP 101.

The item 505 indicates the display forms of buttons for performing one-touch transmission scan registered in the MFP 101. The one-touch transmission scan setting screen 500 also displays the Display/Undisplay buttons 506 for changing the display form of the buttons, and the Delete buttons 507. For example, when the display form of the "Letter of Referral" button is "Display", the button is displayed on the Home screen 400 on the touch panel 440, as in "the Letter of Referral" button 406 illustrated in FIG. 4. The Display/Undisplay buttons 506 enables the user to select either "Display" or "Undisplay" in a toggle manner.

The Delete button 507 deletes information related to the button registered in the MFP 101 when selected by the user.

The button named "Application A" is an example of a button for performing one-touch transmission scan registered in the MFP 101. For this button, the transmission type is "File", and the display form is "display". The button setting editing screen 600 illustrated in FIG. 6 is displayed on the display apparatus 311 not only when the "Register New Button" button 502 is selected but also when the name of an "Application A" button is selected.

FIG. 6 illustrates an example of a button setting editing screen for editing a button to be used for performing a one-touch transmission scan. The button setting editing screen 600 illustrated in FIG. 6 is displayed, for example, on the display apparatus 311 connected to the PC 104 which is accessing the web server of the MFP 101 through HTTP communication.

The button setting editing screen 600 is displayed when the user selects the "Register New Button" button 502 or the name of a button illustrated in FIG. 5. When the user selects the name of a button, the button setting editing screen 600 is displayed in a state where the last setting values are input for each item. When the user selects the "Register New Button" button 502, the button setting editing screen 600 is displayed in a state where the setting values are not input for any item. Default values may be pre-input for each item in the button setting editing screen 600.

An input field 601 is used to set the name of a one-touch transmission button. A character string "Medical Questionnaire" is input to the input field 601. A one-touch transmission button performs one-touch transmission scan when selected by the user.

A pull-down menu 602 is an object for setting a file name. The pull-down menu 602 includes options "Button Name" and "Automatic". When "Button Name" is selected, the button name input to the input field 601 becomes the name of a file to be transmitted. When "Automatic" is selected, an automatically determined character string becomes the name of a file. For example, the date and time when scan is performed by the user selecting a one-touch transmission button to be registered in the screen illustrated in FIG. 6 is used as the name of the file.

A pull-down menu 603 is an object for setting how and whether the transmitted file is to be organized. The user can select one from among "Do Not Organize", and "Organize (File)", "Organize (Folder)" in the pull-down menu 603. When "Do Not Organize" is selected, a keyword is not used. When "Organize (File)" is selected, a keyword is to be included in an output file name. When "Organize (Folder)" is selected, a keyword is to be included in the folder name of a folder to which a file is to be stored.

A pull-down menu 604 is an object for selecting the transmission type in transmitting image data generated by reading a document. The user can select one from among "File", "E-mail", and "USB Memory" in the pull-down menu 604. When "File" is selected and then a Change button 605 is selected, the image data is transmitted to a folder of the PC 104 or the file server 102 by using such a protocol as SMB, FTP, WebDAV, and Secure Shell File Transfer Protocol (SFTP). When "E-mail" is selected, the image data is transmitted to a destination by using SMTP, When "USB Memory" is selected, the image data is stored in the USB memory as the external storage device 210 connected to the MFP 101.

The Change button 605 is used for changing the transmission type setting to the transmission type displayed in the pull-down menu 604, When the Change button 605 is selected with a transmission type selected from the pull-down menu 604, the item 606 corresponding to the selected transmission type is displayed.

For the item 606, various settings including scan settings for reading an image on a document with a one-touch transmission scan, and transmission settings for transmission can be input.

The area 607 displays a transmission destination to which the image data generated by reading a document is transmitted. The destination set in this area 607 is a folder path to be combined with the character string of a text object (described below). The area 607, a text area where a text can be neither input nor edited, displays the address selected in the address selection screen. The selected address will be described below.

A "Selection from Address Book" button 608 is used for displaying, when selected by the user, an address selection screen 700 in which addresses in the address book stored in the MFP 101 can be selected.

A pull-down menu 609 is used for setting a file format to be used in generating a file of image data generated by an image on a document being read. A file is generated based on the selected format.

An OK button 610 is used for storing the settings for the one-touch transmission button in the storage 204 with the settings set in the button setting editing screen 600. When the OK button 610 is selected, the settings are stored in the storage 204. A Cancel button 611 is used to cancel the settings. When the OK button 610 or the Cancel button 611 is pressed, the one-touch transmission scan setting screen 500 illustrated in FIG. 5 is displayed.

Figure 7:
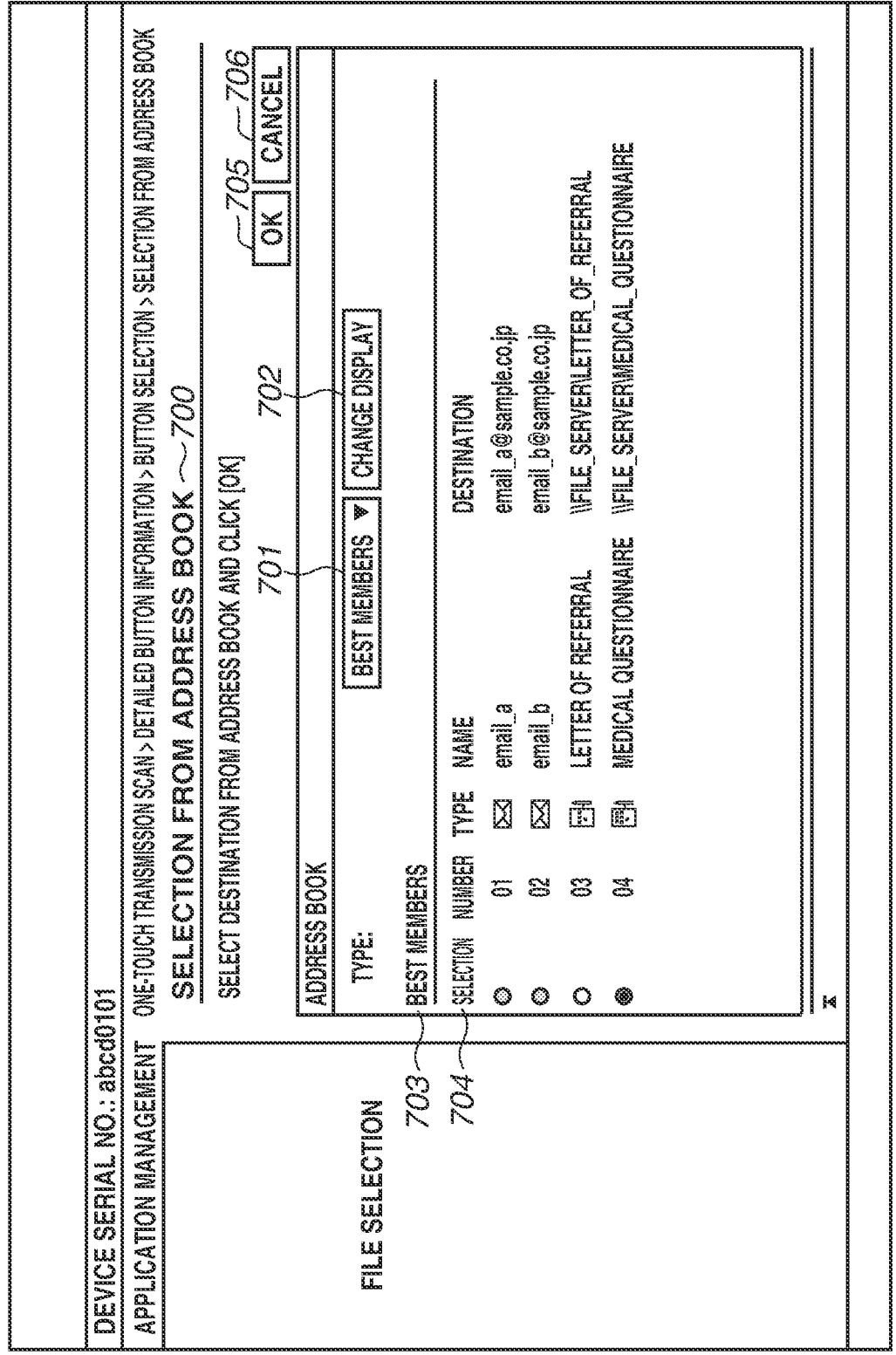
FIG. 7 illustrates an example of an address selection screen.

FIG. 7 illustrates an example of an address selection screen. The address selection screen 700 is displayed by the user selecting the "Selection from Address Book" button 608 in the button setting editing screen 600 illustrated in FIG. 6. The address selection screen 700 illustrated in FIG. 7 is displayed, for example, on the display apparatus 311 connected to the PC 104 which is accessing the web server of the MFP 101 through HTTP communication.

A pull-down menu 701 is a list for changing the type of the address book to be displayed in the address selection screen 700. The pull-down menu 701 enables selection of either one of "Best Members" and "Abbreviated Dialing" (not illustrated).

A Change Display button 702, when selected by the user, changes the type of the address book to be displayed in the address selection screen 700 to the type displayed in the pull-down menu 701.

An area 703 is a display area where the name of the address book is displayed. A list 704 is an area where an address list is displayed. Each line in the list 704 includes Selection (a selectable check box), Number, Type, Name, and Destination. For Selection, either one of a checkable check box and an uncheckable check box is displayed. For Number, the address management number is displayed. For Type as an icon display area, a different icon is displayed based on the address type. For Name, the name attached to the address is displayed. For Destination, the address is displayed.

When an OK button 705 is selected in a state where the check box is checked, the corresponding address is displayed in the area 607. The MFP 101 stores the address in the storage 204 as the destination address of the image data.

Supplementary information regarding the display of a checkable check box and an uncheckable check box will be described below. FIG. 7 illustrates a screen display in a case where the user selects an address from the address book "Best Members" in a state where "File" is selected in the pull-down menu 604 illustrated in FIG. 6. In the address book "Best Members", two addresses with the "E-mail" transmission type and two addresses with the "File" transmission type are registered. For an address of which the type coincides with the type in the pull-down menu 604, a checkable check box is displayed. More specifically, an uncheckable check box is displayed for addresses of Numbers 01 and 02, and a checkable check box is displayed for addresses of Numbers 03 and 04.

The OK button 705 is used to determine address selection with the settings made in the address selection screen 700. A Cancel button 706 is used to cancel the settings. When the OK button 705 or the Cancel button 706 is selected, the button setting editing screen 600 illustrated in FIG. 6 is displayed.

Figure 8:
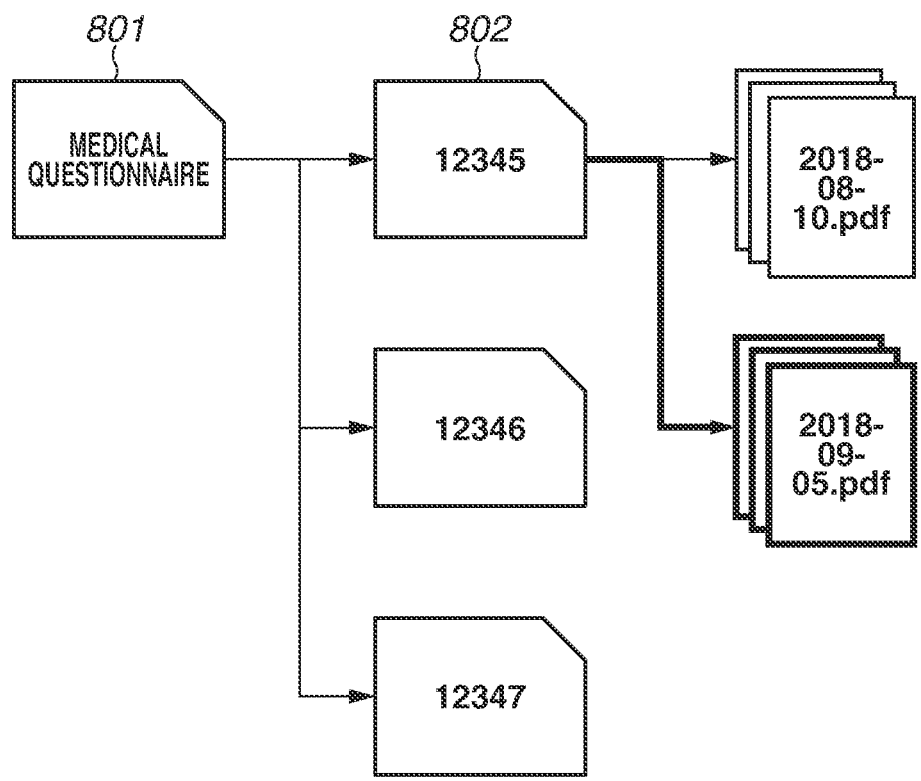
FIG. 8 illustrates an example of a folder configuration in a file server.

FIG. 8 illustrates an example of a folder configuration in the file server 102. FIG. 8 illustrates a folder configuration of the file server 102 as a file transmission destination according to the present exemplary embodiment. The file server 102 has a shared folder with the MFP 101 to store a medical questionnaire. The file server 102 has a configuration including a medical questionnaire folder 801 as the highest-level folder, subfolders 802 by patient ID, and medical questionnaire files (PDF files) each having a file name indicating the date of consultation, under the patient ID folder.

Figure 9:
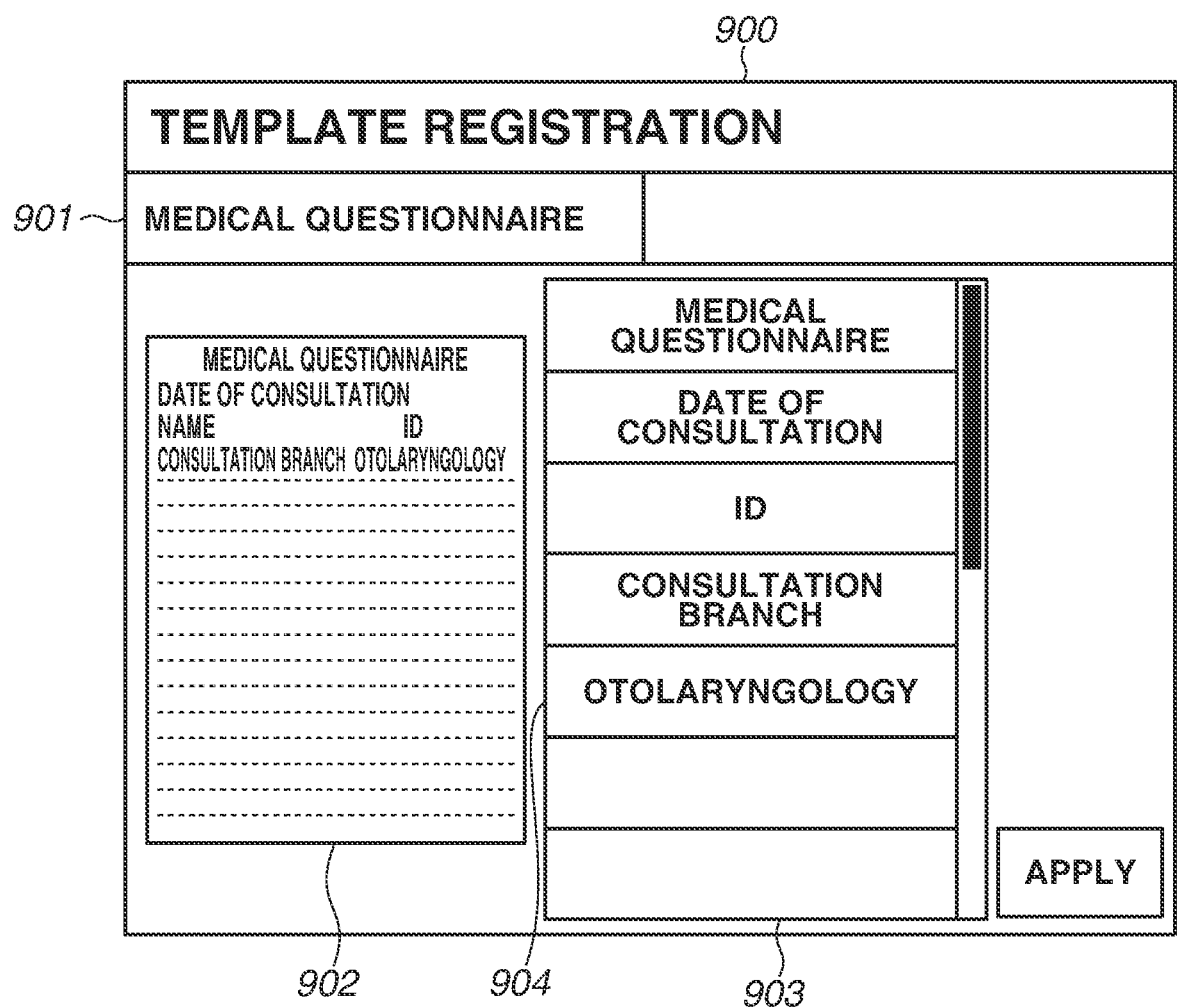
FIG. 9 illustrates an example of a template registration screen.

FIG. 9 illustrates an example of a Template Registration screen. A Template Registration screen 900 is displayed on the operation unit 205 when the Template Registration button 407 illustrated in in FIG. 4 is selected.

When the Template Registration button 407 is selected, a document set on the scanner 207 starts being read, the character recognition processing is performed on the image data of the read document, and the Template Registration screen 900 is displayed.

A registration destination button 901 displays the button name of the one-touch transmission button to be associated with a template. When this button is selected, the one-touch transmission button for template registration can be changed.

A preview image 902 displays the image data, generated by the scanner 207 reading a document, and then converted into a RAW image for liquid crystal display.

A text object list 903 is a list of text objects each of which corresponds to one line (covering from "Medical Questionnaire" to "Otolaryngology"). The character recognition processing is performed on the image data generated by the scanner 207 reading the document, and a set of recognized characters close to each other is displayed as one object. As a result of the character recognition processing, the CPU 201 handles a collection of recognized characters (text clipping square) with predetermined intervals or less, as a character string. The text object list 903 displays each character string as a text object. The text object list 903 displays text objects from the text object corresponding to the text clipping square at the top left position to the text object corresponding to the text clipping square at the bottom right position, from the top downward. Numerals can also be recognized in the character recognition processing.

The user can exclude any object from the template registration by selecting the object from the text object list 903. For example, in a case where the user selects "Otolaryngology" as a text object 904, the screen is changed to the one illustrated in FIG. 10. FIG. 10 illustrates an example of the Template Registration screen.

Inputting characters of a folder path one by one by using a keyboard takes much time and effort. With a technique discussed in Japanese Patent Application Laid-Open No. 2005-234708, specifying an area in a document eliminates the need of inputting characters of a folder path one by one. If, however, a character string intended to be used as the name of a destination folder by the user is not described in the specified area, the target character string cannot be set n the folder path.

In particular, since the position of the target character string often differs from document to document to be read, it is necessary and troublesome to set an area for each document. Further, if character strings included in the entire document are extracted without specifying an area, and the user is prompted to select one of the extracted character strings for use as a folder name, the user needs to select a character string to be set as a destination from among many character strings. This makes the user's selection operations complicated.

To address these issues, the following processing reduces the user's time and effort in setting a folder path with a character string in the document.

A Template Registration screen 1000 illustrated in FIG. 10 highlights a selected text object 1001 in the text object list 903. When the same object is selected again, the highlighted display is canceled. A scroll bar 1002 is used to check and select text objects which cannot be displayed at one time in the text object list 903. An Apply button 1003 is used to store a list of unselected text objects in the storage 204 as a template. The user can select a plurality of text objects from the text object list 903. In that case, all of the selected text objects are not subjected to the template registration. When the Apply button 1003 is selected, template data based on the selected text objects is generated. An example of template data is illustrated in FIG. 11.

Figure 11:
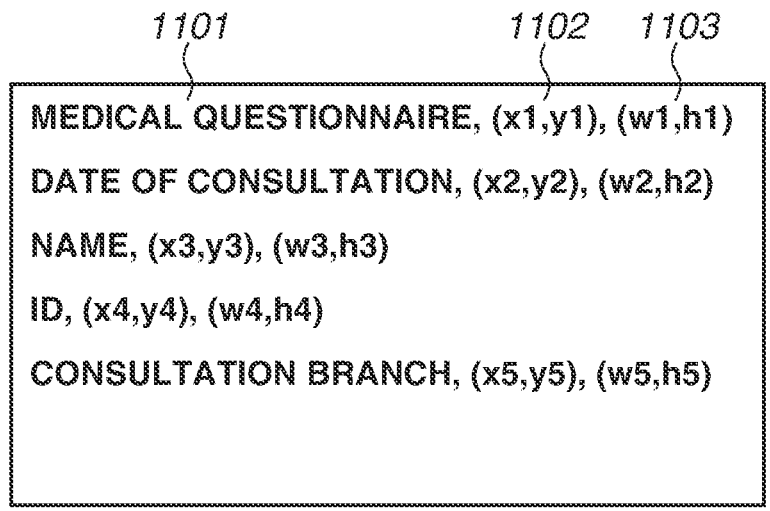
FIG. 11 illustrates an example of template data.

FIG. 11 illustrates an example of template data. A character string 1101 is character string information for the first text object. A coordinate 1102 is position information for the first text object. This position information is coordinate information indicating the coordinates on the image data generated by the MFP 101 reading a document. A size 1103 indicates the size of the area of the first text object. While the value of the size indicates the numerical value of the unit (inches or millimeters) based on the actual document size, the present exemplary embodiment is not limited thereto as long as the unit represents the relative size to the document. For example, the number of pixels may be used. The above-described character string, coordinates, and size are stored in the storage 204 in association with each text object.

The template data may hold all of the information included in the text object or hold part of the information (e.g., only character strings). The template data may be in the text data format or other formats.

Figure 12:
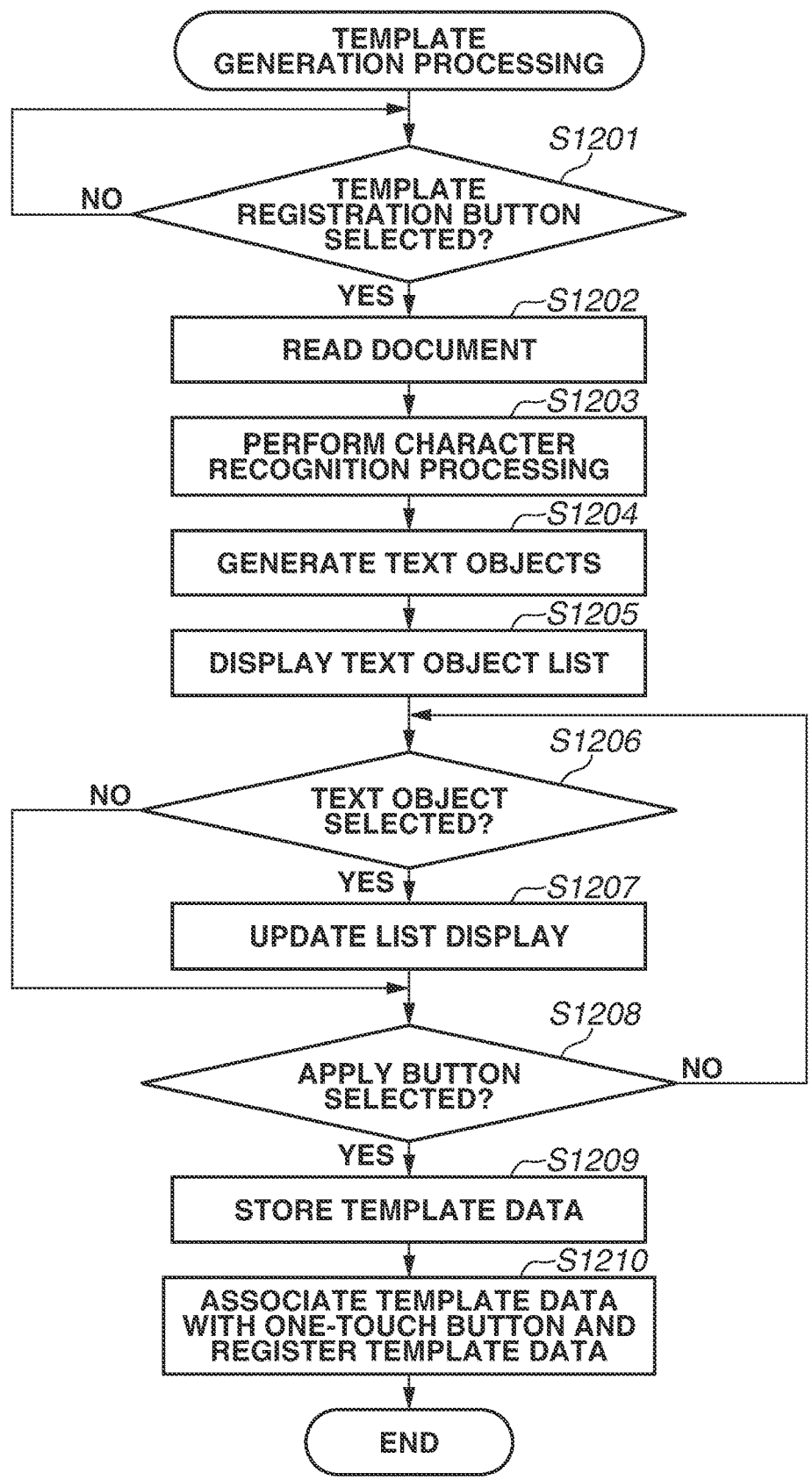
FIG. 12 is a flowchart illustrating an example of template registration processing.

FIG. 12 is a flowchart illustrating an example of template registration processing. Processing of the flowchart illustrated in FIG. 12 is implemented by the CPU 201 loading a program stored in the ROM 202 into the RAM 203 and then executing the program. The flowchart illustrated in FIG. 12 is started when the Home screen 400 is displayed on the operation unit 205.

In step S1201, the CPU 201 determines whether the Template Registration button 407 is selected. If the CPU 201 determines that the button is selected (YES in step S1201), the processing proceeds to step S1202. If the button is not selected (NO in step S1201), the processing returns to step S1201.

In step S1202, the CPU 201 controls the scanner 207 to read the image of the set document, and generates image data. At this timing, an electronic file based on the file format selected from a pull-down menu 609 is also generated.

In step S1203, the CPU 201 performs the character recognition processing on the image data generated in step S1202.

In step S1204, the CPU 201 generates text objects corresponding to character strings acquired as a result of the character recognition processing in step S1203.

In step S1205, the CPU 201 displays a list of the text objects generated in step S1204 on the operation unit 205.

In step S1206, the CPU 201 determines whether a text object is selected from the text object list. If the CPU 201 determines that a text object is selected (YES in step S1206), the processing proceeds to step S1207. If no text object is selected (NO in step S1206), the processing proceeds to step S1208.

In step S1207, the CPU 201 displays on the operation unit 205 a screen in which the selected text object is highlighted, as illustrated in FIG. 10.

In step S1208, the CPU 201 determines whether the Apply button 1003 is selected. If the CPU 201 determines that the Apply button 1003 is selected (YES in step S1208), the processing proceeds to step S1209, If the Apply button 1003 is not selected (NO in step S1208), the processing returns to step S1206.

In step S1209, if the Apply button 1003 is selected, the CPU 201 stores the template data (including the character string, coordinates, and size) corresponding to the selected text object (highlighted object) in the storage 204.

In step S1210, the CPU 201 associates the template data stored in step S1209 with the one-touch button selected in step S1201 and stores the template data in the storage 204. This template data and setting data related to the one-touch button may be stored in the MFP 101 or in a cloud server.

FIG. 13 illustrates an example of a Medical Questionnaire screen. When the Medical Questionnaire button 405 in the Home screen 400 is selected, a Medical Questionnaire screen 1300 illustrated in FIG. 13 is displayed on the operation unit 205.

An area 1301 displays the transmission destination displayed in the area 607 of the button setting editing screen 600 for the one-touch transmission buttons.

An area 1302 displays the character string corresponding to the text object selected from a text object list 1304 (described below). After selecting the area 1302, the user can edit the displayed character string by using, for example, a soft keyboard. In addition, a new character string can also be added when the area 1302 is blank.

A preview image 1303 is a RAW image for liquid crystal display, converted from the image data read from the document. As in the text object list 903, the text object list 1304 displays character strings obtained as a result of performing the character recognition processing on the image data generated by reading the document.

The text object list 1304 of the Medical Questionnaire screen 1300 displays character strings corresponding to differences between the template registered in the Template Registration screen 1000 illustrated in FIG. 10 and the image data generated by reading the image on the document, as text objects. The text objects "Medical Questionnaire" and "Date of Consultation" are included in the registered template data, so that they are not displayed in the list 1304. The character string "Otolaryngology" is selected in the screen illustrated in FIG. 10 and is excluded from the registered template data, so that the character string "Otolaryngology" is redisplayed in the list 1304 of the Medical Questionnaire screen 1300. This configuration enables the display of only text objects of character strings additionally filled in a blank medical questionnaire.

Figure 14:
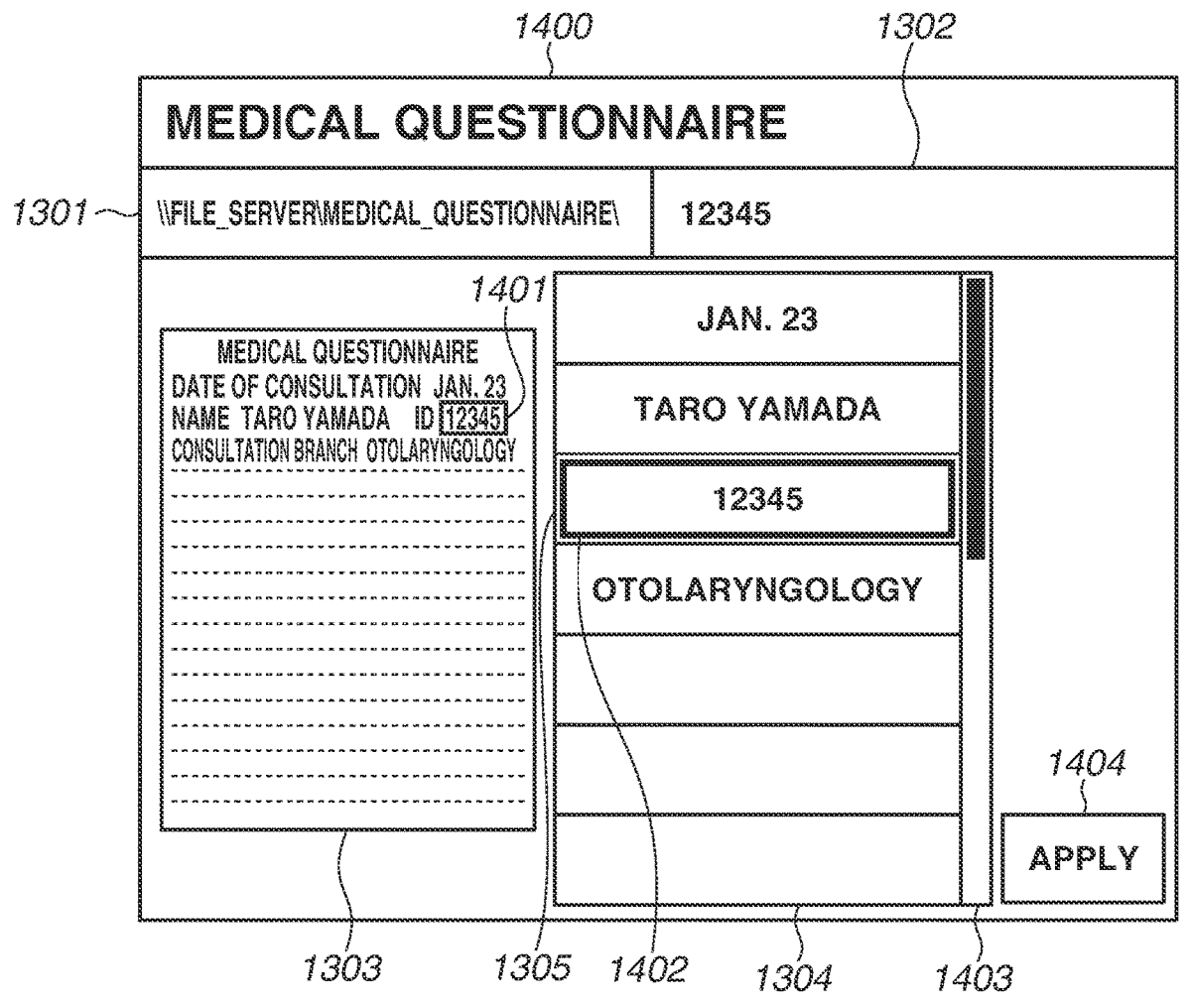

When the user selects "12345" as a text object 1305, a Medical Questionnaire screen 1400 illustrated in FIG. 14 is displayed on the operation unit 205.

FIG. 14 illustrates an example of a medical questionnaire screen. Highlighted display 1402 is displayed since the text object 1305 of the Medical Questionnaire screen 1400 is selected by the user. A character string "12345" as the text object 1305 is selected, so that the character string "12345" is displayed in the area 1302.

Highlighted display 1401 is displayed with emphasis as the area on the preview image corresponding to the selected text object 1305.

A scroll bar 1403 is used to check and select text objects which cannot be displayed at one time in the Medical Questionnaire screen 1400.

An Apply button 1404 is used to, when selected by the user, transmit the image data corresponding to the preview image currently displayed to the set transmission destination. More specifically, the character string of the selected text object is transmitted to the transmission destination which is a combination of the transmission destination being displayed and the character string of the selected text object, appended to the displayed transmission destination as an immediately lower level. According to the present exemplary embodiment, the image data is transmitted to the folder indicated by \\file_server\medical_questionaire\12345.

FIG. 15 is a flowchart illustrating an example of one-touch transmission processing using the template. Processing of the flowchart illustrated in FIG. 15 is implemented by the CPU 201 loading a program stored in the ROM 202 into the RAM 203 and executing the program. The flowchart illustrated in FIG. 15 is started when the Home screen 400 is displayed on the operation unit 205.

In step S1501, the CPU 201 determines whether the Medical Questionnaire button 405 is selected. If the CPU 201 determines that the Medical Questionnaire button is selected (YES in step S1501), the processing proceeds to step S1502. If not (NO in step S1501), the processing returns to step S1501.

In step S1502, the CPU 201 reads the image on the document based on the read settings set in the button setting editing screen 600 and generates image data. The CPU 201 generates, from the generated image data, an electronic file based on the file format selected from the pull-down menu 609.

In step S1503, the CPU 201 performs the character recognition processing on the generated image data.

In step S1504, the CPU 201 generates text objects corresponding to character strings acquired as a result of the character recognition processing.

In step S1505, the CPU 201 determines whether the template data corresponding to the button selected in step S1501 is stored in the storage 204. If the CPU 201 determines that the template data is stored (YES in step S1505), the processing proceeds to step S1506. If the template data is not stored (NO in step S1505), the processing proceeds to step S1507.

In step S1506, the CPU 201 extracts only text objects not included in the template data stored in the storage 204 from among the text objects generated in step S1504. Here, the CPU 201 does not extract character strings included in the coordinates included in the template data. If a character string in coordinates different from the coordinates included in the template data is identical to a character string included in the template data, the CPU 201 may not extract the character string.

In step S1507, the CPU 201 displays the extracted or generated text objects in list form.

In step S1508, the CPU 201 determines whether a text object is selected from the displayed list. If the CPU 201 determines that a text object is selected (YES in step S1508), the processing proceeds to step S1509. If no text object is selected (NO in step S1508), the processing proceeds to step S1510.

In step S1509, the CPU 201 displays the character string corresponding to the selected text object in the area 1302.

In step S1510, the CPU 201 determines whether the Apply button 1404 is selected. If the CPU 201 determines that the button is selected (YES in step S1510), the processing proceeds to step S1511. If the button is not selected (NO in step S1510), the processing returns to step S1508.

In step S1511, the CPU 201 transmits the generated electronic files to the transmission destination as a combination of the transmission destination displayed in the area 1301 and the character string displayed in the area 1302, in which the character string is added to one lower level of the displayed transmission destination.

Performing the above-described processing makes it possible to reduce the time and effort of the user in setting a folder path by using a character string in the document.

While the present exemplary embodiment has been described above centering on an example where differences from the template data are displayed in a text object list, and a user's selection is accepted when executing the one-touch transmission scan function, the present invention is not limited thereto. For example, the CPU 201 may perform the above-described processing in performing optical character recognition (OCR) processing in a regular scan and transmission function.

While the present exemplary embodiment has been described above centering on an example where the character recognition processing is performed on the image data generated by the MFP 101 reading the image on a document, and template data is generated based on acquired character strings, the present invention is not limited thereto. For example, the MFP 101 stores the image data itself generated by reading a document, in the storage 204 as template data. Then, when a one-touch transmission button (e.g., the Medical Questionnaire button 405) is selected, the MFP 101 may compare the image data generated by reading the image on a document with the image data as the template data. As a result of the comparison, the MFP 101 may extract only character strings not included in the template data (image data) but included in the generated image data, and display the extracted character strings in the list 1304. A known image recognition technique may be used to acquire differences between the image data as the template data and the image data generated by reading a document for transmission. In this case, the MFP 101 performs the character recognition processing on the image data generated based on the differences acquired in the image recognition processing, and displays the acquired result as a list.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068838, filed Mar. 29, 2019, which is hereby incorporated by reference herein in its entirety.

What is claimed is:

1. An image processing apparatus comprising:
a registration unit configured to register first image data;
a character recognition unit configured to recognize one or more character strings included in the first image data and one or more character strings included in second image data different from the first image data;
a display unit configured to display one or more character strings that are obtained by recognition of the one or more character strings included in the second image data by the character recognition unit;
a reception unit configured to receive a selection, by a user, of a character string from among the one or more character strings displayed by the display unit; and
a storage unit configured to store the second image data in a folder named with the character string based on the selection received by the reception unit,
wherein the display unit displays the one or more character strings that are obtained by recognition of the one or more character strings included in the second image data and that are not obtained by recognition of the one or more character strings included in the first image data, and
wherein, the display unit does not display one or more character that are obtained by recognition of the one or more character strings included in the second image data and that are obtained by recognition of the one or more character strings included in the first image data.

2. The image processing apparatus according to claim 1, further comprising a generation unit configured to generate third image data corresponding to a difference between the first image data and the second image data,
wherein the character recognition unit recognizes one or more character strings included in the third image data, and the display unit displays one or more character strings obtained by recognition of the one or more character strings included in the third image data.

3. The image processing apparatus according to claim 1, further comprising a generation unit configured to generate the second image data by reading an image on a document.

4. The image processing apparatus according to claim 1, wherein the display unit displays a list of the one or more character strings that are obtained by recognition of the one or more character strings included in the second image data.

5. The image processing apparatus according to claim 1, further comprising a folder path reception unit configured to receive an input of a folder path,
wherein the storage unit stores the second image data in the folder indicated by a path as a combination of the folder path received by the folder path reception unit and the selected character string.

6. The image processing apparatus according to claim 1, wherein the one or more character strings that are obtained by recognition of the one or more character strings included in the second image data include a number.

7. An image processing apparatus comprising:
a registration unit configured to register first image data;
a character recognition unit configured to recognize one or more character strings included in the first image data and one or more character strings included in second image data different from the first image data;
a display unit configured to display one or more character strings that are obtained by recognition of the one or more character strings included in the second image data by the character recognition unit;
a reception unit configured to receive a selection, by a user, of a character string from among the one or more character strings displayed by the display unit; and a storage unit configured to store the second image data in a folder named with the character string based on the selection received by the reception unit, wherein the display unit displays one or more character strings that are obtained by recognition of the one or more character strings included in the second image data and that are included in an area, in the second image data, that is substantially same as an area, in the first image data, not including one or more character strings, and wherein the display unit does not display one or more character strings that are included in an area, in the second image data, that is substantially same as an area, in the first image data, including one or more character strings.

8. The image processing apparatus according to claim 7, further comprising a generation unit configured to generate the second image data by reading an image on a document.

9. The image processing apparatus according to claim 7, wherein the display unit displays a list of the one or more character strings that are obtained by recognition of the one or more character strings included in the second image data.

10. The image processing apparatus according to claim 7, further comprising a folder path reception unit configured to receive an input of a folder path, wherein the storage unit stores the second image data in the folder indicated by a path as a combination of the folder path received by the folder path reception unit and the selected character string.

11. The image processing apparatus according to claim 7, wherein the one or more character strings that are obtained by recognition of the one or more character strings included in the second image data include a number.

12. A method for controlling an image processing apparatus, the method comprising:

registering first image data;

recognizing one or more character strings included in the first image data and one or more character strings included in second image data different from the first image data;

displaying one or more character strings that are obtained by recognition of the one or more character strings included in the second image data;

receiving a selection, by a user, of a character string from among the displayed one or more character strings; and storing the second image data in a folder named with the character string based on the selection received in the receiving, wherein the one or more character strings that are obtained by recognition of the one or more character strings included in the second image data and that are not obtained by recognition of the one or more character strings included in the first image data is displayed, and wherein one or more character strings that are obtained by recognition of the one more character strings included in the second image data and that are obtained by recognition of the one or more character strings included in the first image data is not displayed.

13. A method for controlling an image processing apparatus, the method comprising:

registering first image data;

recognizing one or more character strings included in the first image data and one or more character strings included in second image data different from the first image data;

displaying one or more character strings that are obtained by recognition of the one or more character strings included in the second image data;

receiving a selection, by a user, of a character string from among the displayed one or more character strings; and storing the second image data in a folder named with the character string based on the received selection, wherein one or more character strings that are obtained by recognition of the one or more character strings included in the second image data and that are included in an area, in the second image data, that is substantially same as an area, in the first image data, not including one or more character strings are displayed, and wherein one or more character strings that are included in an area, in the second image data, that is substantially same as an area, in the first image data, including one or more character strings are not displayed.

14. A non-transitory computer-readable storage medium storing a program that, when executed by a computer, causes the computer to perform a method for controlling an image processing apparatus, the method comprising:

registering first image data;

recognizing one or more character strings included in the first image data and one or more character strings included in second image data different from the first image data;

displaying one or more character strings that are obtained by recognition of the one or more character strings included in the second image data;

receiving a selection, by a user, of a character string from among the displayed one or more character strings; and storing the second image data in a folder named with the character string based on the selection received in the receiving, wherein the one or more character strings that are obtained by recognition of the one or more character strings included in the second image data and that are not obtained by recognition of the one or more character strings included in the first image data are displayed, and wherein one or more character strings that are obtained by recognition of the one or more character strings included in the second image data and that are obtained by recognition of the one or more character strings included in the first image data are not displayed.

15. A non-transitory computer-readable storage medium storing a program that, when executed by a computer, causes the computer to perform a method for controlling an image processing apparatus, the method comprising:

registering first image data;

recognizing-one or more character strings included in the first image data and one or more character strings included in second image data different from the first image data; displaying one or more character strings that are obtained by recognition of the one or more character strings included in the second image data;

receiving a selection, by a user, of a character string from among the displayed one or more character strings; and storing the second image data in the folder named with a character string based on the received selection, wherein one or more character strings that are obtained by recognition of the one or more character strings included in the second image data and that are included in an area, in the second image data, that is substantially same as an area, in the first image data, not including one or more character strings are displayed, and wherein one or more character strings that are included in an area, in the second image data, that is substantially same as an area, in the first image data, including one or more character strings are not displayed.

* * * * *